May 8, 1962
P. JANES
3,033,643
PROCESS AND APPARATUS FOR THE INTIMATE MIXING OF STREAMING
FLUIDS AND FOR THE PURIFICATION OF AIR, PARTICULARLY
BY MEANS OF SEPARATING SUBSTANCES
CONTAINED IN GAS AND LIQUIDS
Filed July 30, 1958
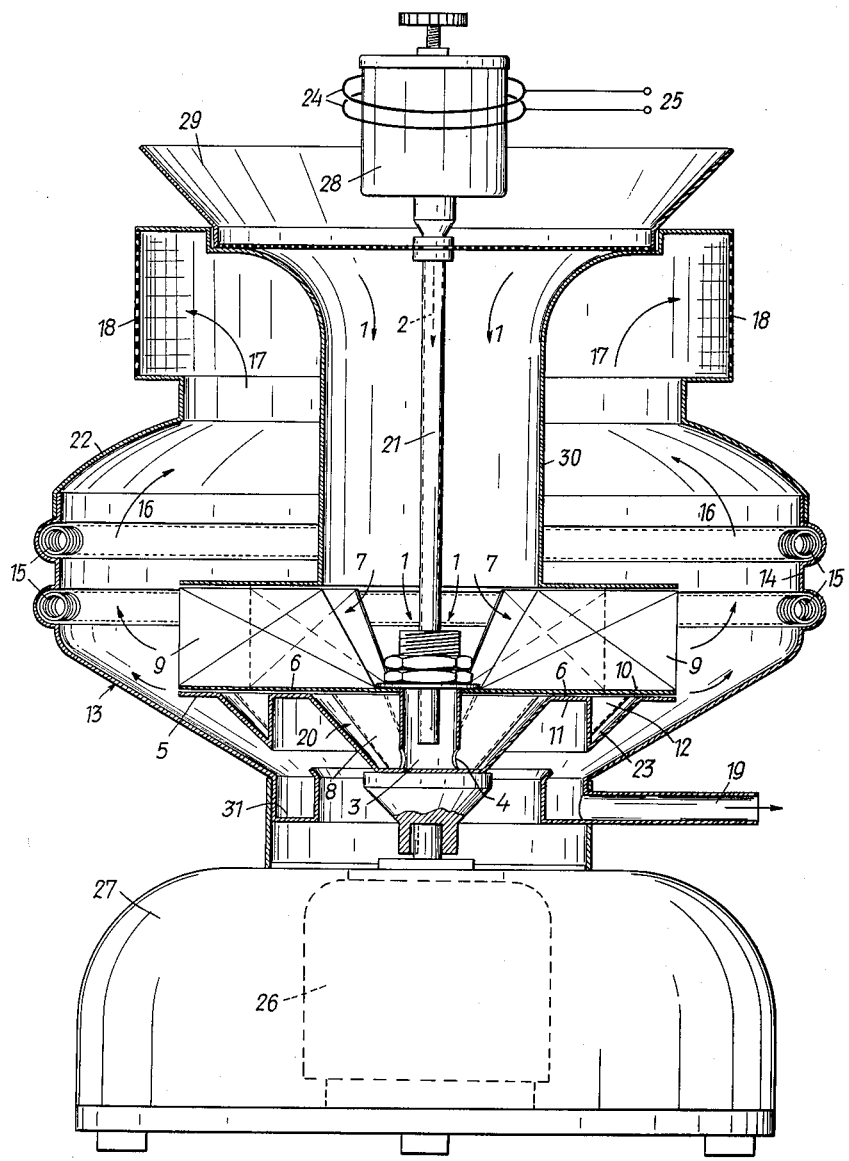
Inventor
Paul Janes
by Michael S. Striker
Attorney United States Patent Office 3,033,643
Patented May 8, 1962

3,033,643
PROCESS AND APPARATUS FOR THE INTIMATE MIXING OF STREAMING FLUIDS AND FOR THE PURIFICATION OF AIR, PARTICULARLY BY MEANS OF SEPARATING SUBSTANCES CONTAINED IN GAS AND LIQUIDS
Paul Janes, 152 Wiedner Haupstrasse, Vienna, Austria
Filed July 30, 1958, Ser. No. 752,076
Claims priority, application Austria Aug. 17, 1957
12 Claims. (Cl. 23—4)

The invention relates to a process and an apparatus for the intimate mixing of streaming fluids, and for the purification of air, particularly by means of separating of substances contained in gas and liquids. The purpose of the invention, as described below, is to eliminate the various disadvantages and deficiencies, inherent to the different hitherto known liquid atomizers and to the apparatuses for the formation of wet-aerosols intended for the purification of the air. It has been proved that the above-mentioned apparatuses being used as air conditioning and air purifying devices, producing a visible mist on basis of an even extra fine pulverization of the liquid, will constitute a rapidly sedimentizing precipitation so that the dirt particles contained in the air of the room will—it is true—be precipitated to the floor during the time of action of the apparatus, but will—when the action has ceased—be temporarily bound to the precipitation of the pulverized liquid, whereupon said particles will be dried by the floor heat of the room and will again be mixed up with the air of the room in the shape of dust. In consequence thereof, the air of the room doubtlessly will be moistened to a certain degree but the impurities contained therein will be whirled about as it were by a ventilator so that—in contradistinction to the present invention—the air of the room will in practice never be purified at all but the impurities will remain in the room as before. The same refers to the well-known ozone apparatuses which, by means of the ozone-oxygen-concentrate $O_3$ are capable of eliminating the germs and the odours from the air of the room, but which, none the less, are incapable of freeing the air from the impurities adhering. It is well-known that the ozone-oxygen-concentrate $O_3$ is a dangerous poison for human beings and animals, but when transformed into the normal breathing air oxygen $O_2$ and diluted respectively as this is done in the course of the inventive process it is the indispensable elixir of life.

According to the invention avoiding the disadvantages of the apparatuses known these aims are attained in the following manner: For obtaining aerosols consisting of the air of the room and of liquids most finely pulverized, e.g., one fluid (air of the room) is intimately mixed in a separate mixing chamber with one or several fluids, e.g., a liquid to be atomized, whereupon said mixture for intimately mixing by way of multi-stage compressions and expansions, is passed through narrow gaps and interpolated expansion spaces. Then a further partial stream of the first-mentioned fluid (e.g. air of the room as before) is added and the mixture is flung on to the inner walls of a housing by way of rebound surfaces. On these inner surfaces, and in particular on helical surfaces, and similar surface enlarging devices, the impurities contained in the air of the room are precipitated and condensed into big drops, so that they can be discharged outwards (at 19), whereas the fluids, compulsory guided, will stream off as precipitation-free dry aerosols. Besides, the invention provides for surface enlarging means, located on the inner wall of the housing, such as roughenings, ribs, needles, helical surfaces, and the like. Furthermore, the air of the room can be freed from germs and odours by a device arranged in the air suction duct and producing there ozone "$O_3$." When passing through the mixing device which follows the ozone is diluted by the micro-mist produced therein and transformed into the normal breathing oxygen $O_2$ respectively which works at supplementing the oxygen of the air of the room already consumed. In order to supplement the oxygen necessary for the formation of the ozone, a pipe line is provided feeding the apparatus from outside with a quantity of fresh air absolutely necessary.

A further essential advantage of the invention resides in the final product not forming a visible precipitation, as the air of the room sucked in is in the housing continually under-cooled, owing to the heat evaporation caused by the expansion of the air-fluid mixture, so that the aerosoles obtained are free from condensations and precipitations, i.e. that they are dry aerosols. A still more efficient under-cooling of the air of the room can be easily obtained by adding ice crystals in the suction branch. The heat which is required for some medical treatment or for other special purposes may be easily produced by appropriate heating bodies after the mixture of the respective fluids by means of a special pipe line. The mixing device in the interior of the housing may simultaneously be fed with various liquid means which e.g. cannot be mixed with water or with one another said fluids to be introduced directly into the mixing device by way of a plurality of pipe lines. Additionally, the assembly of the discharge valves for impurities and condensates can be fitted with suitable filters and can be enlarged according to requirements.

The drawing shows the subject matter of the invention in one embodiment by way of example.

The multi-stage conical centrifugal compressor unit 20 is rotated by the motor 26 lodged in the base 27 of the apparatus. The reference number 28 relates to a dosing container holding a liquid, e.g. water for the purification of the air with or without an admixture of certain acting substances, as disinfectants, medicaments, essential oils, scents of all kinds, cosmetics, antibiotics, insecticides, and the like. With the centrifugal compressor unit 20 rotating air of the room flows through conduit 30 according to arrow 1 and part of this air is mixed in a mixing chamber 3 with the liquid flowing through the pipe 21 (ref. to arrow 2). Under the action of said rotation of the centrifugal compressor unit 20 said mixture passes first through the openings 4 provided in the walls of the mixing chamber 3; then it is intimately mixed in the interior by the impulse blade segments 8 arranged to constitute a star in the cone-shaped centrifugal compressor 20; then the mixture is pressed by the centrifugal force through the narrow gap 6 between the upper cover plate 10 and the lower plate 11, whereupon it expands again through the enlarged recess 23 and the impulse segments 12 of the centrifugal compressor arranged therein in the shape of a star. Finally the mixture is compressed again through the narrow gap 5 on the periphery of the mixing device and is after leaving the mixing device united with a partial stream (according to arrow 7) of the first-mentioned fluid which is impelled by the impeller blades 9. The entire mixture is thus flung against the inner wall 14 of the housing 13. Purified and eventually loaded with acting substances (activators) and free from condensations and precipitations aerosol mixture flows in the direction of the arrows 16 and 17 through open annular gaps 18, whilst the particles of dirt accumulated in the condensate developing on the helical surfaces 15 in the form of heavy condensation drops are visibly pushed into a duct 31 and, further, by way of the impurities draining pipe 19 (taking along the impurities contained therein) to the filter chamber arranged outside of the housing or directly into a duct provided for this purpose which means that what takes place is practically like washing dirty linen.

On the inner wall 14 of the housing 13 there is a guiding collar 22 curved towards the middle which deflects the aerosol mixture obtained to the air-liquid flow pipe 30 in the centripetal direction and which—owing to the particular shape of the guiding collar—causes it to flow off in the radial direction along same so that it is discharged into the room through the open annular gap. As may be gathered from the drawing a cup 29 can be placed on top of the housing 13 through which by way of a piping fresh air can be adduced. Thus it is possible to mix and thus ameliorate already with fresh air within the apparatus the air of the room flowing to the apparatus. The central liquid adduction pipe leading to the centrifugal compressor unit 20 carries the number 21. Besides, the drawing shows that the centrifugal compressor unit 20 has the shape of a cone and is provided with recesses in the centre as well as towards the periphery in which recesses the impeller segments 8, 12 are arranged in the manner of a star. Consequently, the fluid pressed through between the upper cover plate 10 with its air impelling blades 9 and the lower conically shaped plate 11 will be made to expand several times and will again be compressed on its way to the periphery. This process of compressing, expanding and re-compressing in a preparatory stage already results in a very intimate mixture and atomization.

24 is the reference number of electrodes, which are connected to a source 25 of electrical energy and which, thanks to the ozone produced, free the induced from germs and odours.

The invention is, of course, not confined to the embodiment shown. For instance for the liquid a plurality of containers 28 may be provided of which each one is provided with a pipe line 21 leading to the mixing room 3 by way of a dosing organ. One of these pipe lines 21 may also be directly joined to the water conduct.

The apparatus may also be used for the separation of various mixable liquids as e.g. of alcohol, mineral waters and the like. In this case the more volatile liquid rises upwards in the shape of an aerosol, whilst the other liquid is precipitated and is discharged from the apparatus through the drain pipe 19.

It goes without saying that the present process may also be used for the production of air-fuel mixtures for combustion chambers and internal combustion engines. In this case one of the main advantages resides in that the mixing ratio may be exactly dosed so that thanks to the intimate mixture a complete combustion is effected without noxious residues.

I claim:

1. A process for cleaning gas comprising the steps of mixing gas with at least one liquid; subjecting the mixture to a centrifuging action and successively expanding and compressing said mixture during said centrifugal action so as to atomize said liquid and to mix said gas intimately with said atomized liquid; guiding the compressed and atomized mixture into an expansion and condensing zone; intimately mixing a substantially dry gas in said zone with said expanding atomized mixture, whereby part of the atomized liquid condensing in said zone will precipitate impurities contained in the gas; and guiding the condensate with the impurities therein and the cleaned and moistened gas in different directions, respectively to limit contact between the cleaned gas and the condensate.

2. A process for cleaning gas comprising the steps of mixing gas with at least one liquid; subjecting the mixture to a centrifuging action and successively expanding and compressing said mixture during said centrifugal action so as to atomize said liquid and to mix said gas intimately with said atomized liquid; rapidly expanding the mixture at the end of the centrifuging action in an expansion and condensing zone so as to cool said mixture; intimately mixing a substantially dry gas in said zone with said mixture, whereby part of the atomized liquid condensing in said zone will precipitate impurities contained in the gas and guiding the condensate with the impurities therein and the cleaned and moistened gas in different directions, respectively to limit contact between the cleaned gas and the condensate.

3. A process for cleaning air comprising the steps of subjecting a stream of air to an ozonizing action; mixing the ozonized air with at least one liquid; subjecting the mixture to a centrifuging action and successively expanding and compressing said mixture during said centrifugal action so as to atomize said liquid and to mix said air intimately with said atomized liquid; transforming the ozone in said mixture into $O_2$ and ionized oxygen; guiding the compressed and atomized mixture into an expansion and condensing zone; intimately mixing a substantially dry gas in said zone with said expanding atomized mixture, whereby part of the atomized liquid condensing in said zone will precipitate impurities contained in the gas; and guiding the condensate with the impurities therein and the cleaned and moistened air in different directions, respectively to limit contact between the cleaned gas and the condensate.

4. Centrifugal gas cleaning apparatus, comprising, in combination, a mixing chamber; feeding means for feeding gas to be cleaned and at least one liquid into said mixing chamber; centrifugal means communicating with said mixing chamber, said centrifugal means being turnable about an axis and including a pair of rotatable chamber means spaced from each other in a direction transverse to said axis, rotatable narrow passage means extending between and communicating with said pair of chamber means, rotatable narrow outlet means communicating with the outer of said pair of chamber means and extending outwardly therefrom, and at least one impeller blade extending in a direction transverse to said axis in each of said chamber means, so that a mixture of gas and liquid entering from said mixing chamber into said centrifugal means will be subjected to a centrifugal action while being successively expanded and condensed so that the liquid of the mixture is atomized and intimately mixed with the gas; means for rotating the centrifugal means at high speed about the axis thereof; housing means forming an expansion chamber surrounding said centrifugal means spaced from said outlet means thereof and having a roughened surface located in the path of the stream of moistened gas emanating from said outlet means so that part of the moisture will be condensed while impinging on said roughened surface; means for feeding a stream of dry gas toward said roughened surface to be mixed with said stream of moistened gas; and means formed by said housing means for feeding cleaned gas and condensate in opposite directions to limit contact between cleaned gas and condensate.

5. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of annular chamber means spaced from each other in a direction transverse to said axis, passage means forming a narrow annular gap extending between and communicating with said pair of chamber means, outlet means in form of a narrow annular gap communicating with the outer of said pair of chamber means and extending outwardly therefrom, and a plurality of substantially radially extending impeller blades in each of said chamber means, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; housing means forming an expansion chamber surrounding said centrifugal means and said impeller means and having a roughened surface located in the path of the stream of moistened gas emanating from said outlet means and in the path of the stream of gas emanating from said outlet opening means of said impeller means so that part of the moisture will be condensed while impinging on said roughened surface; and means formed by said housing means for feeding cleaned gas and condensate in opposite directions to limit contact between cleaned gas and condensate.

6. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of coextensive discs extending substantially parallel and slightly spaced from each other, one of said discs being formed with at least two annular indentations spaced from each other in a direction transverse to said axis and the outer of said indentations spaced from the periphery of said discs so as to form between said disc a pair of annular chambers communicating with each other through a narrow annular gap and at the periphery of said discs an outlet means also in form of a narrow annular gap, and a plurality of substantially radially extending impeller blades in each of said chambers, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; housing means forming an expansion chamber surrounding said centrifugal means and said impeller means and having a roughened surface located in the path of the stream of moistened gas emanating from said outlet means and in the path of the stream of gas emanating from said outlet opening means of said impeller means so that part of the moisture will be condensed while impinging on said roughened surface; and means formed by said housing means for feeding cleaned gas and condensate in opposite directions to limit contact between cleaned gas and condensate.

7. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of coextensive discs extending substantially parallel and slightly spaced from each other, one of said discs being formed with at least two annular indentations spaced from each other in a direction transverse to said axis and the outer of said indentations spaced from the periphery of said discs so as to form between said discs a pair of annular chambers communicating with each other through a narrow annular gap and at the periphery of said discs an outlet means also in form of a narrow annular gap, one of said discs being movable in axial direction toward and away from the other of said discs so as to adjust the width of said gaps, means for adjusting the distance of said discs from each other, and a plurality of substantially radially extending impeller blades in each of said chambers, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; housing means forming an expansion chamber surrounding said centrifugal means and said impeller means and having a roughened surface located in the path of the stream of moistened gas emanating from said outlet means and in the path of the stream of gas emanating from said outlet opening means of said impeller means so that part of the moisture will be condensed while impinging on said roughened surface; and means formed by said housing means for feeding cleaned gas and condensate in opposite directions to limit contact between cleaned gas and condensate.

8. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of coextensive discs extending substantially parallel to each other, one of said discs being formed with at least two annular indentations spaced from each other in a direction transverse to said axis and the outer of said indentations spaced from the periphery of said discs so as to form between said discs a pair of annular chambers, one of said discs being movable in axial direction toward and away from the other of said discs, spring means tending to press one of said discs against the other of said discs so that said discs will abut against each other along a pair of annular surfaces respectively located between said chambers and between the outer of said chambers and the periphery of said discs when said centrifugal means is at a standstill, and a plurality of substantially radially extending impeller blades in each of said chambers, said one disc being displaced against the action of said spring means away from said other of said discs when said centrifugal means is rotated by the pressure of a mixture of gas and liquid centrifuged by said centrifugal means so that a narrow gap-shaped passage will be formed between said annular surfaces located between said chambers and a narrow gap-shaped outlet means will be formed between said annular surfaces located at the periphery of said discs, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; housing means forming an expansion chamber surrounding said centrifugal means and said impeller means and having a roughened surface located in the path of the stream of moistened gas emanating from said outlet means and in the path of the stream of gas emanating from said outlet opening means of said impeller means so that part of the moisture will be condensed while impinging on said roughened surface; and means formed by said housing means for feeding cleaned gas and condensate in opposite directions to limit contact between cleaned gas and condensate.

9. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of annular chamber means spaced from each other in a direction transverse to said axis, passage means forming a narrow annular gap extending between and communicating with said pair of chamber means, outlet means in form of a narrow annular gap communicating with the outer of said pair of chamber means and extending outwardly therefrom, and a plurality of substantially radially extending impeller blades in each of said chamber means, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlets means so as to direct a stream of dry gas into said stream of moistened gas; means for rotating said mixing chamber, said centrifugal means and said impeller means together at high speed about said axis; and housing means forming an expansion chamber surrounding said feeding means, said centrifugal means and said impeller means and coaxially arranged therewith and having a roughened surface located in the path of the stream of moistened gas emanating from said outlet means and in the path of the stream of gas emanating from said outlet opening means of said impeller means so that part of the moisture will be condensed while impinging on said roughened surface, said housing having above said roughened surface a first upwardly inclined guide surface directed toward said feeding means for feeding the cleaned gas in upward direction and below said roughened surface a second downwardly inclined guide surface for feeding the condensate in direction away from the cleaned gas to limit contact between the cleaned gas and the condensate.

10. Centrifugal gas cleaning apparatus comprising, in combination, a mixing chamber having an axis; first conduit means arranged coaxially with said mixing chamber for feeding substantially dry gas to be cleaned into said mixing chamber; second conduit means located within said first conduit means and coaxially arranged therewith for feeding at least one liquid into said mixing chamber; ozonizing means located in said first conduit means; centrifugal means communicating with said mixing chamber, said centrifugal means being arranged coaxial with said mixing chamber and being turnable about said axis and including a pair of annular chamber means spaced from each other in a direction transverse to said axis, passage means forming a narrow annular gap extending between and communicating with said pair of chamber means, outlet means in form of a narrow annular gap communicating with the outer of said pair of chamber means and extending outwardly therefrom, and a plurality of substantially radially extending impeller blades in each of said chamber means, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first conduit means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; and housing means forming an expansion chamber surrounding said feeding means, said centrifugal means and said impeller means and coaxially arranged therewith and having a roughened surface located in the path of the stream of moistened gas emanating from said outlet means and in the path of the stream of gas emanating from said outlet opening means of said impeller means so that part of the moisture will be condensed while impinging on said roughened surface, said housing having above said roughened surface a first upwardly inclined guide surface directed toward said first conduit means for feeding the cleaned gas in upward direction and below said roughened surface a second downwardly inclined guide surface for feeding the condensate in direction away from the cleaned gas to limit contact between the cleaned gas and the condensate.

11. Centrifugal gas cleaning apparatus comprising, in combination, a mixing chamber having an axis; first feeding means for feeding substantially dry gas to be cleaned into said mixing chamber; second feeding means for feeding at least one liquid into said mixing chamber; centrifugal means communicating with said mixing chamber, said centrifugal means being arranged coaxial with said mixing chamber and being turnable about said axis and including a pair of annular chamber means spaced from each other in a direction transverse to said axis, passage means forming a narrow annular gap extending between and communicating with said pair of chamber means, outlet means in form of a narrow annular gap communicating with the outer of said pair of chamber means and extending outwardly therefrom, and a plurality of substantially radially extending impeller blades in each of said chamber means, so that a mixture of gas and liquid entering from said mixing chamber into said centrifugal means will be subjected to a centrifugal action while being successively expanded and condensed so that the liquid of the mixture is atomized and intimately mixed with the gas when said centrifugal means is rotated so that a stream of moistened gas will leave said outlet means; impeller means coaxially arranged with said centrifugal means and having an inlet opening communicating with said first feeding means and outlet opening means adjacent and directed substantially in the same direction as said annular outlet means so as to direct a stream of dry gas into said stream of moistened gas; means for rotating said mixing chamber, said centrifugal means and said impeller means together at high speed about said axis; housing means forming an expansion chamber surrounding said centrifugal means and said impeller means and having a roughened surface located in the path of the stream of moistened gas emanating from said outlet means and in the path of the stream of gas emanating from said outlet opening means of said impeller means so that part of the moisture will be condensed while impinging on said roughened surface; and means formed by said housing means for feeding cleaned gas and condensate in opposite directions to limit contact between cleaned gas and condensate, said means including channel means located in said housing below said roughened surface thereof for receiving the condensed moisture and for feeding the same out of said housing means.

12. Centrifugal gas cleaning apparatus comprising, in combination, centrifugal means for atomizing a liquid fed thereinto and for intimately mixing the atomized liquid with a gas fed into the centrifugal means while alternately expanding and compressing said mixture; feeding means for feeding gas and liquid into said centrifugal means; expansion chamber means surrounding said centrifugal means and have a roughened surface portion; outlet means communicating with said centrifugal means for directing the mixture of atomized liquid and gas in the form of a stream of compressed moistened gas onto said roughened surface portion of said expansion chamber means; means for directing a stream of substantially dry gas to be cleaned into said stream of moistened gas emanating from said outlet means toward said roughened surface so that part of the moisture contained in said mixture will be condensed and precipitate impurities contained in said gas to be cleaned; and guide means formed by said expansion chamber means for feeding cleaned gas and condensate in opposite directions to limit contact between said cleaned gas and said condensate containing impurities.

References Cited in the file of this patent

UNITED STATES PATENTS

| | | |
|---|---|---|
| 1,083,057 | Clawson | Dec. 30, 1913 |
| 2,143,628 | Lea | Jan. 10, 1939 |
| 2,396,526 | Nilsson | Mar. 12, 1946 |
| 2,763,982 | Dega | Sept. 25, 1956 |
| 2,847,083 | Hibshman | Aug. 12, 1958 |